J. H. GRUBE.
TIRE LINER.
APPLICATION FILED DEC. 28, 1917. RENEWED JUNE 4, 1919.
1,309,249.
Patented July 8, 1919.
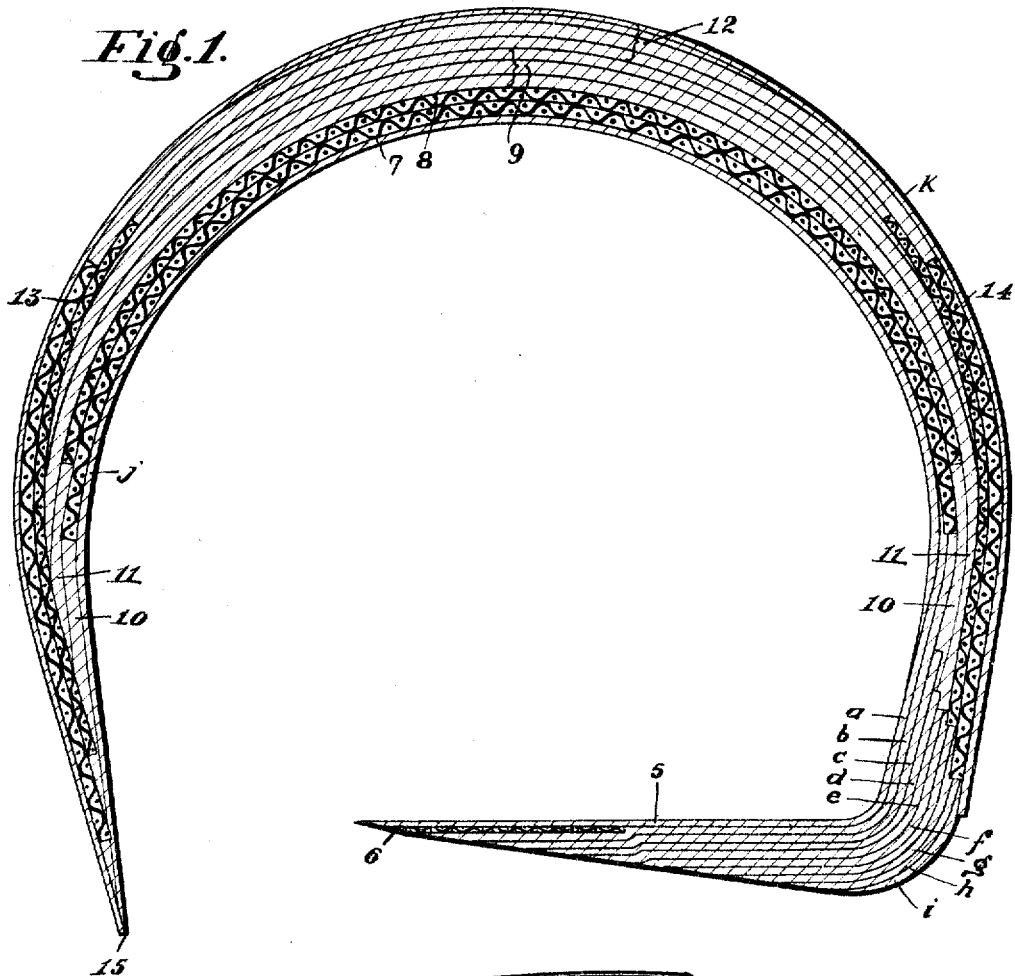
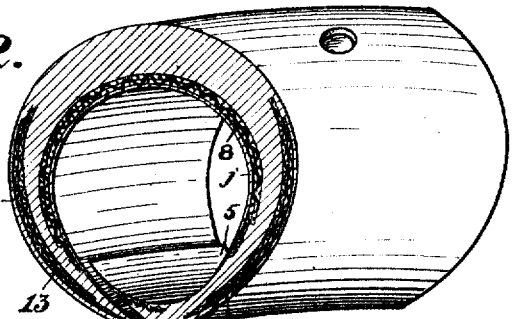
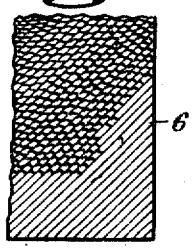
INVENTOR.
John H. Grube

UNITED STATES PATENT OFFICE.

JOHN H. GRUBE, OF LOS ANGELES, CALIFORNIA, ASSIGNOR TO AIRSAFE INNER TIRE COMPANY, OF LOS ANGELES, CALIFORNIA, A CORPORATION OF NEVADA.

TIRE-LINER.

1,309,249.  Specification of Letters Patent.  Patented July 8, 1919.

Application filed December 28, 1917, Serial No. 209,281. Renewed June 4, 1919. Serial No. 301,810.

*To all whom it may concern:*

Be it known that I, JOHN H. GRUBE, a citizen of the United States, residing at Los Angeles, in the county of Los Angeles and State of California, have invented a new and useful Tire-Liner, of which the following is a specification.

This invention relates to a tire liner adapted to be interposed between the outer casing and inner tube of a pneumatic tire and particularly pertains to improvements in the inner liner set forth in United States Patent Number 1,217,754, issued to me February 27, 1917, and also in my copending application filed August 7, 1916, #113,680½.

Inner liners for pneumatic tires heretofore designed have met with little commercial success and have not come into general use primarily because of the tendency of the liner to pinch the inflatable tube incased therein, thus injuring the tube it is designed to protect. This pinching of the tube is usually caused by the edges formed by the division extending circumferentially of the inner periphery of the liner, the edges overlapping and forming a joint which in working of the tire bites into the inner tube and eventually causing the latter to leak or blow out. This pinching is augmented by lack of proper resiliency and elasticity in the liner and its flap portions.

It is the object of this invention to provide an inner tire which is constructed so as to obviate the above difficulty and at the same time afford protection to the inner tube against puncture and blow outs due to penetration or severance of the outer casing.

A further object is to provide an inner tire having universal elacticity to permit it, on inflation, to conform to an outer casing encompassing same.

Other objects will appear hereinafter.

The invention is illustrated in the accompanying drawings, in which:

Figure 1 is a view in cross section of the tire liner.

Fig. 2 is a perspective view of same as seen in section and elevation.

Fig. 3 is a detail illustrating an elastic cord employed in reinforcing the walls of the liner.

In carrying out the present embodiment of my invention, I employ a specially constructed mold as disclosed in a copending application filed coincident herewith, and in building up a liner I first form an elastic annular flap 5 of tapered cross section. This flap is composed of a series of layers of sheet rubber, indicated at $a, b, c, d, e, f, g, h, i$, which layers are of decreasing widths from $a$ to $i$ and are arranged in the order of their decreasing widths with the widest layer $a$ innermost and with the opposite edges of the layer offset in relation to the edges of the adjacent layer. The outer face of the flap is thus formed with a bevel and tapers to a feathered or wafer outer edge. To reinforce the feathered or wafer edge, a narrow strip of fabric 6 preferably formed of elastic cord, is embedded in the flap, being interposed between the outer portions of the sheets or layers $a$ and $b$. The inner portions of the layers are turned on an arc and their edges terminate in offset relation to each other.

Overlapping the inner face of the inside layer $a$ is a thin strip $j$ of sheet rubber having graphite incorporated therein to render it smooth and non-adhesive, and which strip is turned over the core of the mold to form the transversely arched inner face of the liner, the strip $j$ extending substantially throughout the inner face of the liner. The liner is in the form of an annular tube of substantially circular cross section and divided circumferentially on its inner periphery to provide separable side members with the flap 5 projecting inwardly from one side member to overlap the other side member on the inner side thereof.

In forming the body of the liner, several layers of fabric 7 and 8 are arranged exteriorly of the strip $j$ and extend over the arch portion of the liner and part way along the side portions thereof, the edges of these fabric strips terminating in spaced relation to the edges of the inner strip $j$ and with one edge joining the edges of the layers $a$ and $b$.

A series of sheets of rubber 9 are laid over the fabric strips 7 and 8, and overlap the edges thereof, these sheets joining the offset ends of the layers c, d, e and f on one side of the liner and converging into a filler strip 10 on the strip j on the other side. An elastic body 11 is thus formed in continuation of the edges of the fabric strips and extending thereover.

The tread portion of the liner is formed by a series of layers 12 of rubber, which extend over the central portion of the layers 9 and join the upper edges of fabric reinforcing strips 13 and 14 planted on the outer portions of the elastic strips 9. These fabric strips reinforce the side walls of the liner and are arranged near the outer surface thereof with their outer edges overlapping the edges of the inner fabric strips 7 and 8 in spaced relation thereto. The space between the overlapping fabrics is filled by the elastic sheets 9, which forms an elastic body between the fabric on the crown and the overlap of the fabric on the side portions of the liner. This is important, in that when the liner is placed in an outer casing and an inner tube is inflated therein the liner can expand to conform to the outer casing, and also permits the separate fabrics to work relative to each other on kneading the tire and affords desired elasticity and flexibility throughout the tire and liner.

The outer surface of the liner is formed by a rubber sheet k which extends over the fabric strips 13 and 14 and over the sheets 12. One edge of the sheet k overlaps the layer i and its other edge joins the inside sheet j at the inner edge of the opposite wall of the liner which wall converges to a wafer edge 15. This edge 15 is designed to overlap the flap 5, as shown in Fig. 2 and when so disposed is shaped to encompass an inflatable inner tube and to be inserted in the ordinary pneumatic tire casing.

The various parts described are joined into an integral body by vulcanizing, thus forming a resilient tubular annulus divided on its inner periphery and fitted with an elastic flap in continuation of one edge thereof.

To obtain the desired elasticity, the fabric preferably employed is that commonly termed "cord", which is formed of diagonal strands impregnated and joined by a rubber composition, which permits expansion of the fabric in all directions.

In the application of the liner, an inflatable inner tube is placed therein with the flap 5 disposed between the tube and the opposite side of the liner. The liner is then positioned within the ordinary pneumatic tire casing which is then mounted on a wheel rim in the usual manner. On inflating the inner tube the liner is expanded and pressed tightly against the inner wall of the casing and then serves as a protection to the inner tube against puncture and blow out, the walls of the liner being of such thickness that ordinary causes of punctures will not penetrate to the inner tube, and is of such strength that portions of an outer casing may be removed to expose the inner liner without danger of blow out. This renders the inner liner particularly serviceable where the casing is subjected to unusual wear.

By providing the liner with the flap constructed as here shown and described, danger of pinching the inner tube is obviated, as the flap will readily stretch and conform to its position between the liner and inner tube without pinching.

I claim:

1. An inner liner for auto tires comprising an expansible annulus of tubular formation divided on its inner periphery, one edge of the divided portion formed with a flap of tapered cross section converging to a wafer edge and adapted to overlap the adjacent edge of the liner, said flap formed of resilient material, and an expansible reinforcing fabric embedded in said flap.

2. In a tire liner, an expansible annulus of tubular formation divided on its inner periphery an elastic flap formed in continuation of one of the sides thereof adapted to overlap the other side interiorly thereof, said flap having a wafer edge, a fabric reinforcement in the edge of the flap; a fabric reinforcement extending transversely over the arched portion of the annulus and part way on the sides, and fabric reinforcing strips in the side walls overlapping the edges of the arched reinforcement and spaced therefrom.

3. In a tire liner, an expansible annulus of tubular formation divided on its inner periphery an elastic flap formed in continuation of one of the sides thereof adapted to overlap the other side interiorly thereof, said flap having a wafer edge, a fabric reinforcement in the edge of the flap; an elastic fabric reinforcement extending transversely over the arched portion of the annulus and part way on the sides, and elastic fabric reinforcing strips in the side walls overlapping the edges of the arched reinforcement and spaced therefrom.

4. In a tire liner, an expansible annulus of tubular formation divided on its inner periphery, an elastic flap formed in continuation of one of the sides thereof adapted to overlap the other side interiorly thereof, said flap having a wafer edge, a fabric reinforcement extending transversely over the arched portion of the annulus and part way on the sides, and fabric reinforcing strips in the side walls overlapping the edges of the arched reinforcement and spaced therefrom.

5. In a tire liner, an expansible annulus of tubular formation divided on its inner periphery, an elastic flap formed in continuation of one of the sides thereof adapted to overlap the other side interiorly thereof, said flap having a wafer edge, an elastic fabric reinforcement extending transversely over the arched portion of the annulus and part way on the sides, and elastic fabric reinforcing strips in the side walls overlapping the edges of the arched reinforcement and spaced therefrom.

JOHN H. GRUBE.